United States Patent [19]

Erckert

[11] Patent Number: 5,448,466
[45] Date of Patent: Sep. 5, 1995

[54] METHOD FOR LIMITING THE FREQUENCY OF A VOLTAGE-CONTROLLED OSCILLATOR IN A CONTROL CIRCUIT OF A RESONANT CONVERTER SWITCHED-MODE POWER SUPPLY, AND CONTROL CIRCUIT FOR A RESONANT CONVERTER SWITCHED-MODE POWER SUPPLY

[75] Inventor: Ricardo Erckert, Assling, Germany

[73] Assignee: Siemens Aktiengesellschaft, Munich, Germany

[21] Appl. No.: 192,562

[22] Filed: Feb. 7, 1994

[30] Foreign Application Priority Data

Feb. 5, 1993 [DE] Germany ............... 43 03 436.5

[51] Int. Cl.$^6$ ............................................. H02M 3/335
[52] U.S. Cl. ................................. 363/16; 363/21; 363/97; 363/131
[58] Field of Search ............... 363/15, 16, 20, 21, 363/95, 97, 131

[56] References Cited

U.S. PATENT DOCUMENTS

| | | | |
|---|---|---|---|
| 4,896,255 | 1/1990 | Schlenk et al. | 363/97 |
| 5,032,972 | 7/1991 | Erckert | 363/97 |
| 5,053,937 | 10/1991 | Blockl | 363/16 |

FOREIGN PATENT DOCUMENTS 0293874 12/1988 European Pat. Off. .
0452981 10/1991 European Pat. Off. .

Primary Examiner—Brian K. Young
Assistant Examiner—Y. Jessica Han
Attorney, Agent, or Firm—Herbert L. Lerner; Laurence A. Greenberg

[57] ABSTRACT

A method for limiting the frequency of a voltage-controlled oscillator in a control circuit of a resonant converter switched-mode power supply includes adjusting a delay time of a delay element disposed in a feedback branch of the voltage-controlled oscillator with a signal indicating a transition from negative to positive values of a current through an oscillating circuit of the switched-mode power supply. A resonant converter switched-mode power supply has an output voltage and an oscillating circuit with a current. A control circuit for the resonant converter switched-mode power supply includes a control amplifier being acted upon by the output voltage and by a reference voltage. A voltage-controlled oscillator is connected to and triggered by the control amplifier. A comparator detects a transition from positive to negative values of the current in the oscillating circuit. A flip-flop has a setting input being connected to and triggered by the voltage-controlled oscillator and has a reset input being connected to and triggered by the comparator. A delay element has a variable delay time and is triggered by a signal indicating a transition from negative to positive values of the current in the oscillating circuit.

6 Claims, 2 Drawing Sheets

METHOD FOR LIMITING THE FREQUENCY OF A VOLTAGE-CONTROLLED OSCILLATOR IN A CONTROL CIRCUIT OF A RESONANT CONVERTER SWITCHED-MODE POWER SUPPLY, AND CONTROL CIRCUIT FOR A RESONANT CONVERTER SWITCHED-MODE POWER SUPPLY

BACKGROUND OF THE INVENTION

FIELD OF THE INVENTION

The invention relates to a method for limiting the frequency of a voltage controlled oscillator in a control circuit of a resonant converter switched-mode power supply, and to a control circuit for a resonant converter switched mode power supply.

In a resonant converter switched-mode power supply, an oscillating circuit, which is typically a series oscillating circuit, is supplied through a first switch with a direct voltage by which the oscillating circuit is excited. After one-half of an oscillating period, the first switch is opened, and the oscillating circuit is connected to ground through a second switch, and as a result the capacitor of the oscillating circuit discharges again, and the oscillation is thus continued. An oscillation can accordingly be excited by alternating opening and closing of the two switches.

The coil of the oscillating circuit is provided by the primary winding of a transformer, and the winding ratio of the transformer is selected in such a way that approximately only the stray inductance appears on the primary side. The resonant frequency of the oscillating circuit consequently is determined by the stray inductance of the transformer and the capacitance of the capacitor.

Through the use of the secondary winding of the transformer, the energy is transferred to a load through a rectifier circuit. The energy transfer is accordingly effected by periodic excitation of the oscillating circuit, and more power can be transferred as the circuit is excited more often.

A decision as to how often the excitation takes place, or in other words the frequency with which the first switch is closed, is determined by a voltage-controlled oscillator, that in turn is triggered by a control amplifier which compares the output voltage of the switched-mode power supply with a reference voltage. The opening of the first switch and the closing of the second switch is brought about by a zero crossover detector, which detects the crossover from positive to negative values of the current by the oscillating circuit.

In the switched-mode power supply described above, the output voltage can be regulated by varying the frequency of the voltage-controlled oscillator. However, if the frequency is raised, then excitation of the oscillating circuit may already occur before the previous complete oscillation cycle of the oscillating circuit has ended, so that energy is taken from the oscillating circuit instead of being supplied to it. That situation arises if the frequency of the voltage-controlled oscillator becomes higher than the resonant frequency of the oscillating circuit for regulating the resonant converter switched-mode power supply, which signifies a turning point. In order to avoid reaching that turning point, the voltage-controlled oscillator with which the oscillating circuit excitation is controlled must be limited in its upper limit frequency.

That has been done heretofore by limiting the output voltage of the control amplifier. Although that method has the advantage of being able to be achieved with a simple circuit, nevertheless the resonant circuit, the oscillator and the limiter circuit must be tuned very precisely to one another. Moreover, production tolerances, for instance in terms of the stray inductance of the transformer and other components, can cause malfunctions at high load. At partial load, instead of the stray inductance, a higher inductance appears in the known circuit. A rapid transition from full load to partial load can cause malfunctions even if the dimensioning is correct. Limiting the control amplifier output voltage is usually performed with diodes. However, diode threshold voltages are temperature-dependent, so that the limitation functions cleanly only within a limited temperature range.

SUMMARY OF THE INVENTION

It is accordingly an object of the invention to provide a method for limiting the frequency of a voltage controlled oscillator in a control circuit of a resonant converter switched-mode power supply, and a control circuit for a resonant converter switched mode power supply, which overcome the hereinafore-mentioned disadvantages of the heretofore-known methods and devices of this general type.

With the foregoing and other objects in view there is provided, in accordance with the invention, in a method for limiting the frequency of a voltage-controlled oscillator in a control circuit of a resonant converter switched-mode power supply, the improvement which comprises adjusting a delay time of a delay element disposed in a feedback branch of the voltage-controlled oscillator with a signal indicating a transition from negative to positive values of a current through an oscillating circuit of the switched-mode power supply.

In accordance with another mode of the invention, there is provided a method which comprises differentiating the signal indicating the transition from the negative to positive values of the current through the oscillating circuit of the switched-mode power supply in order to compensate for transit times.

With the objects of the invention in view, there is also provided, in a resonant converter switched-mode power supply having an output voltage and an oscillating circuit with a current, a control circuit, comprising a control amplifier being acted upon by the output voltage and by a reference voltage; a voltage-controlled oscillator being connected to and triggered by the control amplifier; a first comparator detecting a transition from positive to negative values of the current in the oscillating circuit; a flip-flop having a setting input being connected to and triggered by the voltage-controlled oscillator and having a reset input being connected to and triggered by the first comparator; and a delay element with a variable delay time, the delay element being triggered by a signal indicating a transition from negative to positive values of the current in the oscillating circuit.

In accordance with another feature of the invention, the delay element with variable delay time is formed by an AND gate.

In accordance with a further feature of the invention, there is provided a second comparator generating the signal triggering the delay element.

In accordance with a concomitant feature of the invention, there is provided a differentiating element connected upstream of the other comparator.

An advantage of the invention is that the performance of the resonant converter switched-mode power supply is independent of the dimensioning of the oscillating circuit. Moreover, in the embodiment of the invention, production tolerances of the transformer no longer cause malfunctions. Moreover, a turning point in control is no longer attained at the transition from full load to partial load. Other advantages are the maximum temperature independence of the control circuit and the problem-free dimensioning of the voltage-controlled oscillator.

Other features which are considered as characteristic for the invention are set forth in the appended claims.

Although the invention is illustrated and described herein as embodied in a method for limiting the frequency of a voltage controlled oscillator in a control circuit of a resonant converter switched-mode power supply and a control circuit for a resonant converter switched mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
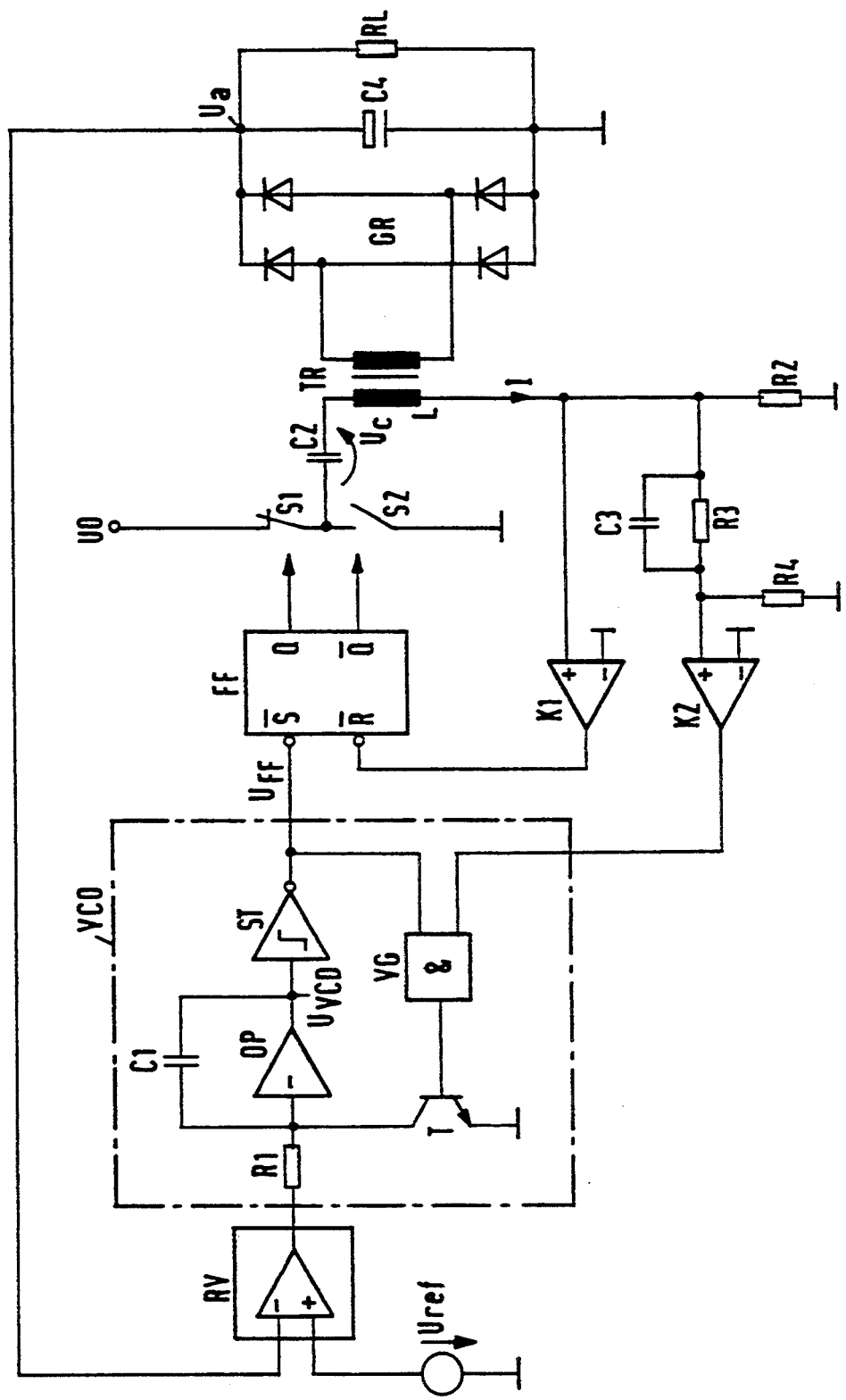
FIG. 1 is a schematic circuit diagram of one possible embodiment of the invention.
Figure 2A:
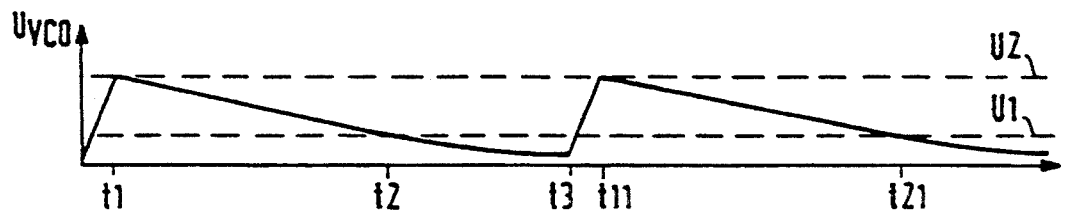
FIGS. 2a–2d are graphs illustrating a time dependency of some signals of the circuit of FIG. 1.
Figure 2B:
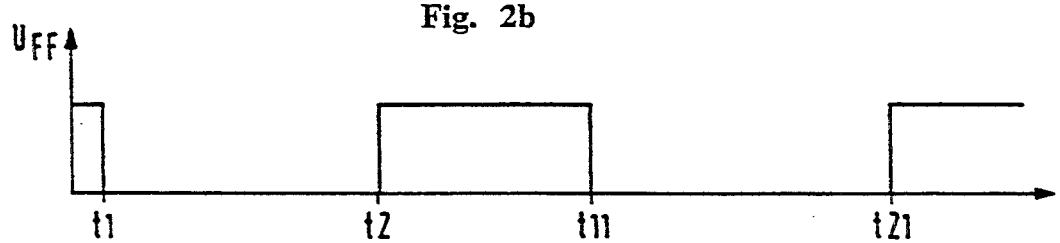
Figure 2C:
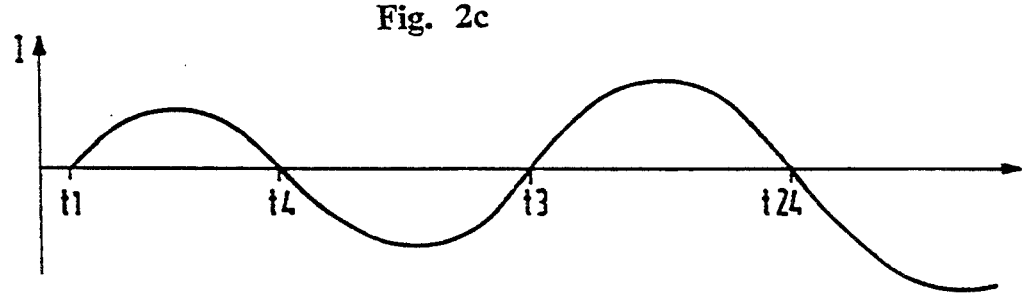
Figure 2D:
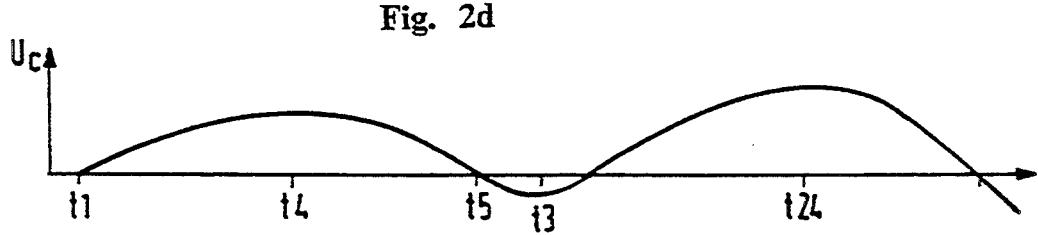

Referring now to the figures of the drawing in detail and first, particularly, to FIG. 1 thereof, there is seen a resonant converter switched-mode power supply in which a series oscillating circuit including a capacitor C2 and a primary winding L of a transformer TR is supplied with a direct voltage U0 through a first switch S1. A current I flowing through the series oscillating circuit generates a voltage in a resistor R2 connected in series with the oscillating circuit, that is detected by a first comparator K1. The first comparator K1 controls an inverting reset input $\overline{R}$ of a flip-flop FF, having first and second outputs Q and $\overline{Q}$ which trigger the first switch S1 and a second switch S2 that is connected in series with the first switch S1.

Energy stored in the series oscillating circuit is delivered to a load RL by means of a secondary winding of the transformer TR, through a full bridge rectifier circuit GR, which $U_a$ which is present at the smoothing capacitor C4 is supplied is followed by a smoothing capacitor C4. An output voltage to a control amplifier RV, by which it is compared with a reference voltage Uref. An output voltage of the control amplifier RV is delivered to a voltage-controlled oscillator VCO. The voltage-controlled oscillator VCO is formed by an integration amplifier, which in turn is formed by an operational amplifier OP, a resistor R1 and a capacitor C1, and which has an output signal $U_{VCO}$ and an inverting Schmitt trigger ST. A delay element VG, which is formed by an AND gate, and an npn transistor T, are disposed in a feedback branch of the voltage-controlled oscillator VCO. The npn transistor T has a collector connected to the inverting input of the operational amplifier OP. An output of the voltage-controlled oscillator VCO, which is formed by an output of the Schmitt trigger ST and to which a signal $U_{FF}$ is applied, is connected to an inverting setting input $\overline{S}$ of the flip-flop FF.

The delay element VG is triggered by an output of a second comparator K2, which has a non-inverting input that is supplied through a differentiating element with a voltage generated at the resistor R2 from the current I. The differentiating element is formed by a serially connected parallel circuit including a resistor R3 and a capacitor C3 as well as a parallel-connected resistor R4.

The function of the circuit of FIG. 1 is described below in terms of signal courses shown in FIGS. 2a–2d.

At a time t1, the output signal $U_{FF}$ of the voltage-controlled oscillator VCO has a trailing edge, and as a result the flip-flop FF, which is acted upon by this signal at its inverting setting input $\overline{S}$, has a logical high level at its first output Q and a logical low level at its second output $\overline{Q}$. As a result, the first switch S1 is closed and the second switch S2 is opened, with the result that the current I flows through the oscillating circuit and the capacitor C2 charges, which is represented by the course of the current I and a voltage $U_C$ in FIG. 2. At the time t1, a new integration period of the integration amplifier also begins, which leads to linear dropping of the signal $U_{VCO}$.

The current I initially increases and then decreases again. A transition from positive to negative values at a time t4 is detected by means of the first comparator K1, which has an output at this zero crossover that acts upon the inverting reset input $\overline{R}$ of the flip-flop FF with a trailing edge, causing the outputs Q, $\overline{Q}$ of the flip-flop FF to switch over. As a result, the first switch S1 is opened and the second switch S2 is closed. The current I then flows in the other direction, and the capacitor C2 discharges again. At a time t2, the output signal $U_{VCO}$ of the integration amplifier reaches a lower threshold of the Schmitt trigger ST. The output signal $U_{FF}$ of the Schmitt trigger ST then switches to the logical high level at that moment, but this high level is not yet switched onward by the AND gate VG, since the output of the second comparator K2 still has a logical low level. It is not until the transition from negative to positive values of the current I that the output of the second comparator K2 changes to a logical high level, as a result of which the output of the AND gate likewise assumes a logical high level and the npn transistor T is switched to be conducting. As a result, the capacitor C1 of the integration amplifier is discharged, which causes a rise in the output voltage $U_{VCO}$ of the integration amplifier. Once this output voltage $U_{VCO}$ reaches an upper threshold value U2 of the Schmitt trigger ST, the output of the Schmitt trigger ST switches over again, whereupon a new oscillation period begins. The differentiating element preceding the second comparator K2 serves to compensate for transit times, for instance of the end element.

The output voltage $U_a$ of the resonant converter switched-mode power supply can be adjusted by the selection of the reference voltage Uref. Fluctuations in this output voltage $U_a$ are stabilized by means of the control circuit described above.

I claim:

1. In a method for limiting the frequency of a voltage-controlled oscillator in a control circuit of a resonant converter switched-mode power supply of the type having an oscillating circuit receiving a direct voltage through a controlled switch, wherein the voltage-controlled oscillator has a delay element connected in a feedback branch thereof, the improvement which comprises the steps of:

controlling the controlled switch with an output signal of the voltage-controlled oscillator; detecting a transition from negative to positive values of a current through the oscillating circuit of the switched-mode power supply; and adjusting a delay time of the delay element on the basis of a value detected in the detecting step.

2. The method according to claim 1, which further comprises differentiating the signal indicating the transition from the negative to positive values of the current through the oscillating circuit of the switched-mode power supply in order to compensate for transit times.

3. In a resonant converter switched-mode power supply of the type having an output voltage and an oscillating circuit with a current, wherein the oscillating circuit receives a constant voltage through a controlled switch, and the switch is controlled with an output signal of a voltage-controlled oscillator with a feedback loop, a control circuit for the resonant converter switched-mode power supply, comprising: a delay element connected in the feedback loop of the voltage-controlled oscillator;

a control amplifier being acted upon by the output voltage of the resonant converter switched-mode power supply and by a reference voltage;

the voltage-controlled oscillator being connected to and triggered by said control amplifier;

a comparator detecting a transition from positive to negative values of the current in the oscillating circuit;

a flip-flop having a setting input connected to and triggered by said voltage-controlled oscillator and having a reset input connected to and triggered by said comparator; and said delay element having a variable delay time and being triggered by a signal indicating a transition from negative to positive values of the current in the oscillating circuit.

4. The control circuit according to claim 3, wherein said delay element with variable delay time is formed by an AND gate.

5. The control circuit according to claim 3, wherein said comparator is a first comparator, and including a second comparator generating the signal triggering said delay element.

6. The control circuit according to claim 5, including a differentiating element connected in front of said second comparator.

* * * * *